(12) United States Patent
Kusano et al.

(10) Patent No.: US 6,309,032 B1
(45) Date of Patent: Oct. 30, 2001

(54) BRAKE CONTROL APPARATUS WITH A STROKE SIMULATOR

(75) Inventors: Akihito Kusano, Toyota; Hiroaki Aizawa; Hiroshi Toda, both of Kariya, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/115,506

(22) Filed: Jul. 15, 1998

Related U.S. Application Data
(60) Provisional application No. 60/066,739, filed on Nov. 21, 1997.

(30) Foreign Application Priority Data

Jul. 17, 1997 (JP) .................................................. 9-192684

(51) Int. Cl.[7] .................................................. B60T 8/40
(52) U.S. Cl. .................................... 303/116.1; 303/113.4
(58) Field of Search ............................ 303/116.1, 116.2, 303/113.4, 114.1, 113.3, 115.1

(56) References Cited

U.S. PATENT DOCUMENTS

| | | | |
|---|---|---|---|
| 5,253,929 | * | 10/1993 | Ohori ........................................ 303/3 |
| 5,326,158 | * | 7/1994 | Ohori et al. .............................. 303/3 |
| 5,333,944 | * | 8/1994 | Shirai et al. ....................... 303/113.4 |
| 5,727,851 | * | 3/1998 | Ohkubo et al. .................... 303/117.1 |
| 5,878,573 | * | 3/1999 | Kobayashi et al. .................. 60/547.1 |
| 5,921,281 | * | 7/1999 | Takayama et al. ................ 303/119.2 |
| 5,941,608 | * | 8/1999 | Campau et al. ................... 303/113.4 |
| 6,135,572 | * | 10/2000 | Worsdorfer et al. .................... 303/10 |

\* cited by examiner

*Primary Examiner*—Robert J. Oberleitner
*Assistant Examiner*—Robert A. Siconolfi
(74) *Attorney, Agent, or Firm*—Burns, Doane, Swecker & Mathis, LLP (57) ABSTRACT

A brake control apparatus is provided with a simulator for applying a biasing force to a manually operated braking member of a vehicle in response to braking operation. A sensor detects conditions of the vehicle including a braking condition of the vehicle. A first biasing device applies a first biasing force to the manually operated braking member in response to braking operation, and a second biasing device applies a second biasing force, as well. Only one of the first and second biasing devices applies the biasing force to the manually operated braking member when a predetermined condition is detected by the sensor, while both of the first and second biasing devices apply the biasing forces in the normal braking operation. The second biasing device may include a cylinder having a bore defined therein, and a piston slidably received in the bore to define a chamber filled with brake fluid, an elastic member for biasing the piston to expand the chamber, and a reservoir communicated with the chamber of the cylinder for storing the brake fluid drained from the cylinder, and controlled by a controller in response to outputs of the sensor.

11 Claims, 10 Drawing Sheets

BRAKE CONTROL APPARATUS WITH A STROKE SIMULATOR

This application claims benefit of Provisional No. 60/066,739 filed Nov. 21, 1997.

This application claims priority under 35 U.S.C. Sec. 119 to No. 9-192684 filed in Japan on Jul. 17, 1997, the entire content of which is herein incorporated by reference.

BACKGROUND OF THE INVENTION

1. Field of the Invention

The present invention relates to a brake control apparatus for controlling a braking force applied to wheels of a vehicle, and more particularly to the brake control apparatus having a stroke simulating function for providing dummy braking load to a vehicle driver.

2. Description of the Related Arts

An apparatus for providing dummy braking load to a vehicle driver in his braking operation is known as a stroke simulator. For example, German patent publication (Offenlegungsshrift) No. 1961039 discloses an apparatus having the stroke simulating function. In that publication, in order to avoid difficulty in forward movement of the brake pedal in the braking operation, a spring is directly mounted on the brake pedal, and a solenoid valve for use in a braking force control device is controlled to increase or decrease the brake pressure in a wheel brake cylinder of the vehicle in response to the depressing force of the brake pedal, to apply the braking force to each wheel, with the dummy braking load applied to the brake pedal. Also, Japanese Patent Laid-open Publication No. 63-64858 discloses an apparatus which has a solenoid valve disposed between a master cylinder and a wheel brake cylinder mounted on a wheel for selectively changing the communication between the master cylinder and the wheel brake cylinder, and the communication between the master cylinder and an absorbing member for consuming the brake fluid.

According to the one having the spring mounted on the brake pedal as disclosed in the above-identified publication, only a fixed braking load may be provided by the biasing force of the spring mounted on the brake pedal. With respect to the above-described apparatus for controlling the solenoid valve to change the communication between the master cylinder and the wheel brake cylinder, or the communication between the master cylinder and the absorbing member, if the solenoid valve is activated, the master cylinder is communicated with the wheel brake cylinder, so that only a fixed braking load may be provided by means of the absorbing member. Thus, any braking loads corresponding to brake feelings determined on the basis of the vehicle conditions and the driver's taste can not be provided.

SUMMARY OF THE INVENTION

Accordingly, it is an object of the present invention to provide a brake control apparatus having a stroke simulator for providing dummy braking loads corresponding to various brake feelings in accordance with conditions of a vehicle and a vehicle driver's taste.

To accomplish the above and other objects, a brake control apparatus is provided with a simulation device for applying a biasing force to a manually operated braking member of a vehicle in response to braking operation of the manually operated braking member. In this apparatus, a detection device is provided for detecting conditions of the vehicle including a braking condition of the vehicle. A first biasing device is provided for applying a first biasing force to the manually operated braking member in response to braking operation of the manually operated braking member, and a second biasing device is provided for applying a second biasing force to the manually operated braking member in response to braking operation of the manually operated braking member. Only one of the first and second biasing devices is adapted to apply the biasing force to the manually operated braking member in response to braking operation of the manually operated braking member, when a predetermined condition is detected by the detection device.

Preferably, the second biasing device comprises a cylinder device including a cylinder having a bore defined therein, and a piston slidably received in the bore to define a chamber filled with brake fluid, an elastic device for biasing the piston to expand the chamber, and a reservoir device communicated with the chamber of the cylinder device for storing the brake fluid drained from the cylinder device.

The brake control apparatus may further include a valve device disposed between the reservoir device and the cylinder device, and a controller for controlling the valve device in response to output of the detection device. The controller is preferably adapted to activate the valve device to apply the second biasing force to the manually operated braking member in response to braking operation of the manually operated braking member, when the predetermined condition is detected by the detection device.

The brake control apparatus according to the present invention may be embodied as follows:

First, the apparatus includes a sensor which is provided for detecting conditions of the vehicle including a braking condition of the vehicle, a first elastic member and a second elastic member which are connected in series with the manually operated braking member to be moved thereby. In this apparatus, only one of the first and second elastic members is adapted to provide a biasing force to the manually operated braking member, when a predetermined condition is detected by the sensor. Accordingly, the brake feeling can be changed under the predetermined condition.

Secondary, in addition to the above components, the apparatus further includes a cylinder in which brake fluid is filled and at least one of the first and second elastic members is accommodated, a piston slidably received in the cylinder, a reservoir for draining the brake fluid from the cylinder, a solenoid valve which is disposed between the reservoir and the cylinder, and a controller which is provided for controlling the valve in response to outputs of the sensor. The controller is adapted to activate the valve to provide a biasing force to the manually operated braking member by only one of the first and second elastic members, when the predetermined condition is detected by the sensor. Accordingly, the manually operated braking member is biased by both of the first and second elastic members in a normal braking operation, while it is biased only by one of the first and second elastic members under the predetermined condition, so that the brake feeling can be provided in accordance with the vehicle conditions and the vehicle driver's taste.

In the apparatus, the first elastic member may be accommodated in the piston to minimize the apparatus.

Thirdly, the apparatus includes a sensor which is provided for detecting conditions of the vehicle including a braking condition of the vehicle, a first elastic member which is connected with the manually operated braking member to be moved thereby, and a master cylinder which is connected with the first elastic member, in series. A first absorbing device is provided for storing the brake fluid from the master cylinder, and provided with a second elastic member which returns the brake fluid to the master cylinder. A solenoid valve is disposed between the first absorbing device and the master cylinder, and a controller is provided for controlling the valve in response to outputs of the sensor. The controller is adapted to activate the valve to provide a biasing force to the manually operated braking member only by the first elastic member, when the predetermined condition is detected by the sensor. Accordingly, the manually operated braking member is biased by both of the first and second elastic members in a normal braking operation, while it is biased only by the first elastic member under the predetermined condition, so that the brake feeling can be provided in accordance with the driver's taste with a simple structure using a conventional master cylinder.

Fourthly, the apparatus includes a sensor which is provided for detecting conditions of the vehicle including a braking condition of the vehicle, a cylinder in which a first elastic members connected with the manually operated braking member to be moved thereby is accommodated, a piston slidably received in the cylinder, a reservoir for draining the brake fluid from the cylinder, a solenoid valve which is disposed between the reservoir and the cylinder, and a master cylinder which is connected with the first elastic member, in series. A first absorbing device is provided for storing the brake fluid from the master cylinder, and provided with a second elastic member which returns the brake fluid to the master cylinder, and a controller is provided for controlling the valve in response to outputs of the sensor. The controller is adapted to activate the valve to provide a biasing force to the manually operated braking member only by the second elastic member, when the predetermined condition is detected by the sensor. Accordingly, the manually operated braking member is biased by both of the first and second elastic members in a normal braking operation, while it is biased only by the second elastic member under the predetermined condition, so that the brake feeling can be provided in accordance with the vehicle conditions and the driver's taste.

Fifthly, the apparatus includes a sensor which is provided for detecting conditions of the vehicle including a braking condition of the vehicle, a master cylinder which is connected with the first elastic member, a first absorbing device for storing the brake fluid from the master cylinder and having therein a first elastic member for returning the brake fluid to the master cylinder, and a second absorbing device for storing the brake fluid from the master cylinder and having therein a second elastic member for returning the brake fluid to the master cylinder. A solenoid valve is disposed between the first absorbing device and the master cylinder, and a controller is provided for controlling the valve in response to outputs of the sensor. The controller is adapted to activate the valve to provide a biasing force to the manually operated braking member only by the second elastic member, when the predetermined condition is detected by the sensor. Accordingly, the manually operated braking member is biased by both of the first and second elastic members in a normal braking operation, while it is biased only by the second elastic member under the predetermined condition, so that the brake feeling can be provided in accordance with the driver's taste with a simple structure using a conventional master cylinder.

Sixthly, the apparatus includes a sensor which is provided for detecting conditions of the vehicle including a braking condition of the vehicle, a master cylinder which is connected with a manually operated braking member in series, and which has first and second pressure chambers, a first absorbing device for storing the brake fluid from the first pressure chamber and having therein a first elastic member for returning the brake fluid to the master cylinder, and a second absorbing device for storing the brake fluid from the second pressure chamber and having therein a second elastic member for returning the brake fluid to the master cylinder. A solenoid valve is disposed between the first absorbing device and the first pressure chamber, and a controller is provided for controlling the valve in response to outputs of the sensor. The controller is adapted to activate the valve to provide a biasing force to the manually operated braking member only by the second elastic member, when the predetermined condition is detected by the sensor. Accordingly, the manually operated braking member is biased by both of the first and second elastic members in a normal braking operation, while it is biased only by the second elastic member under the predetermined condition, so that the brake feeling can be provided in accordance with the driver's taste with a simple structure using a conventional master cylinder having dual pressure chambers.

With respect the sensor, preferably, a depressing force sensor may be employed for detecting a depressing force of the manually operated braking member. A stroke sensor may be employed for detecting a depressing speed of the manually operated braking member. A steering angle sensor may be employed for detecting a steering angle of the vehicle. A pressure sensor may be employed for detecting pressure applied to a wheel brake cylinder or a master cylinder. A wheel speed sensor may be employed for detecting a vehicle speed. Accordingly, the vehicle conditions including braking condition of the vehicle can be detected accurately. Furthermore, a mode switch may be provided for selectively energizing the solenoid valve, so that the brake feeling can be provided in accordance with the driver's taste.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
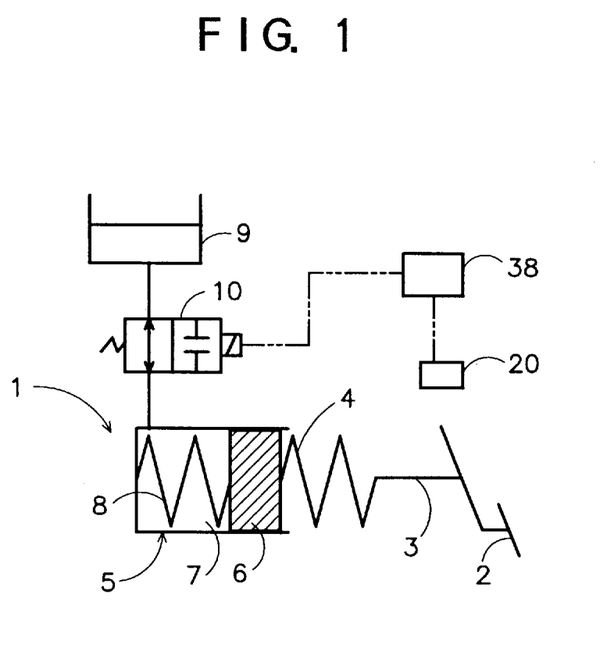
FIG. 1 is a block diagram illustrating a stroke simulator for use in a brake control apparatus according to a first embodiment of the present invention.

Referring to FIG. 1, there is schematically illustrated a first embodiment of a stroke simulator 1 for use in a brake control apparatus according to the present invention. The stroke simulator 1 includes a cylinder 5, a piston 6 slidably received therein, a first elastic member 4, a second elastic member 8, a solenoid valve 10, a reservoir 9 for storing brake fluid, a controller 38 for controlling the solenoid valve 10, and a sensor 20 which is electrically connected to the controller 38. The sensor 20 represents various sensors such as a steering angle sensor for detecting a steering angle of a vehicle, a depressing force sensor for detecting depressing force applied to a brake pedal 2, a stroke sensor for detecting depressed amount of the brake pedal or depressing speed thereof calculated on the basis of the depressed amount, pressure sensors for detecting pressures in wheel brake cylinders operatively mounted on the wheels, wheel speed sensors for detecting wheel speeds of the wheels, and etc.

Figure 2:
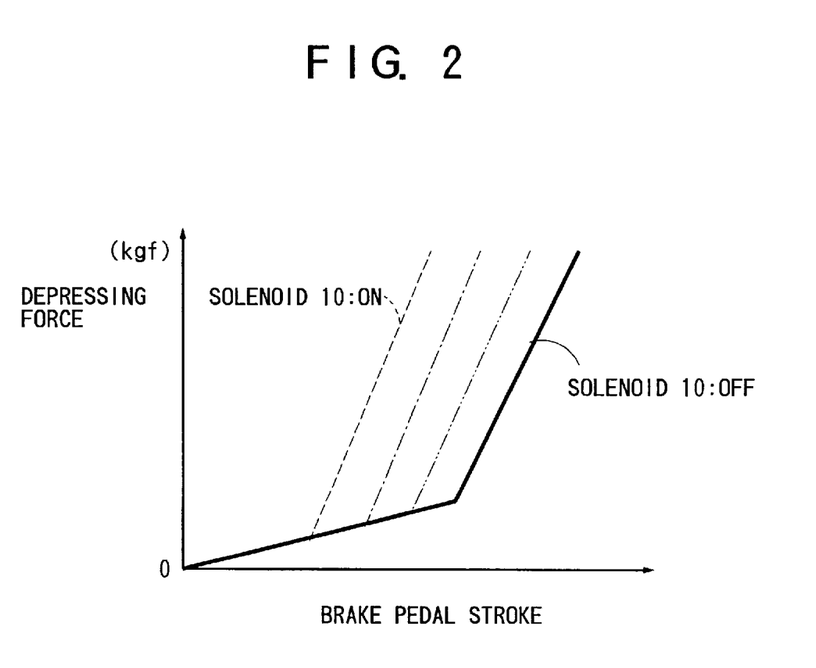
FIG. 2 is a diagram showing a relationship between a depressing force and a brake pedal stroke in the above embodiment.

The first elastic member 4 and the second elastic member 8 of springs are aligned with a rod 3, which is connected to the brake pedal 2. The second elastic member 8 is disposed in a pressure chamber 7 which is defined in the cylinder 5, and the volume of which is varied in response to sliding movement of the piston 6. The second elastic member 8 is adapted to bias the piston 6 to its initial position. The reservoir 9 under atmospheric pressure is provided for receiving the brake fluid drained from the pressure chamber 7 through an outlet port in the cylinder 5. The solenoid valve 10 of a normally open type is disposed between the reservoir 9 and the pressure chamber 7 of the cylinder 5, and controlled by the controller 38 on the basis of the signals output from the sensor 20. According to this embodiment, therefore, the depressing force characteristic can be changed from a given position of the brake pedal stroke, as shown in FIG. 2.

Figure 3:
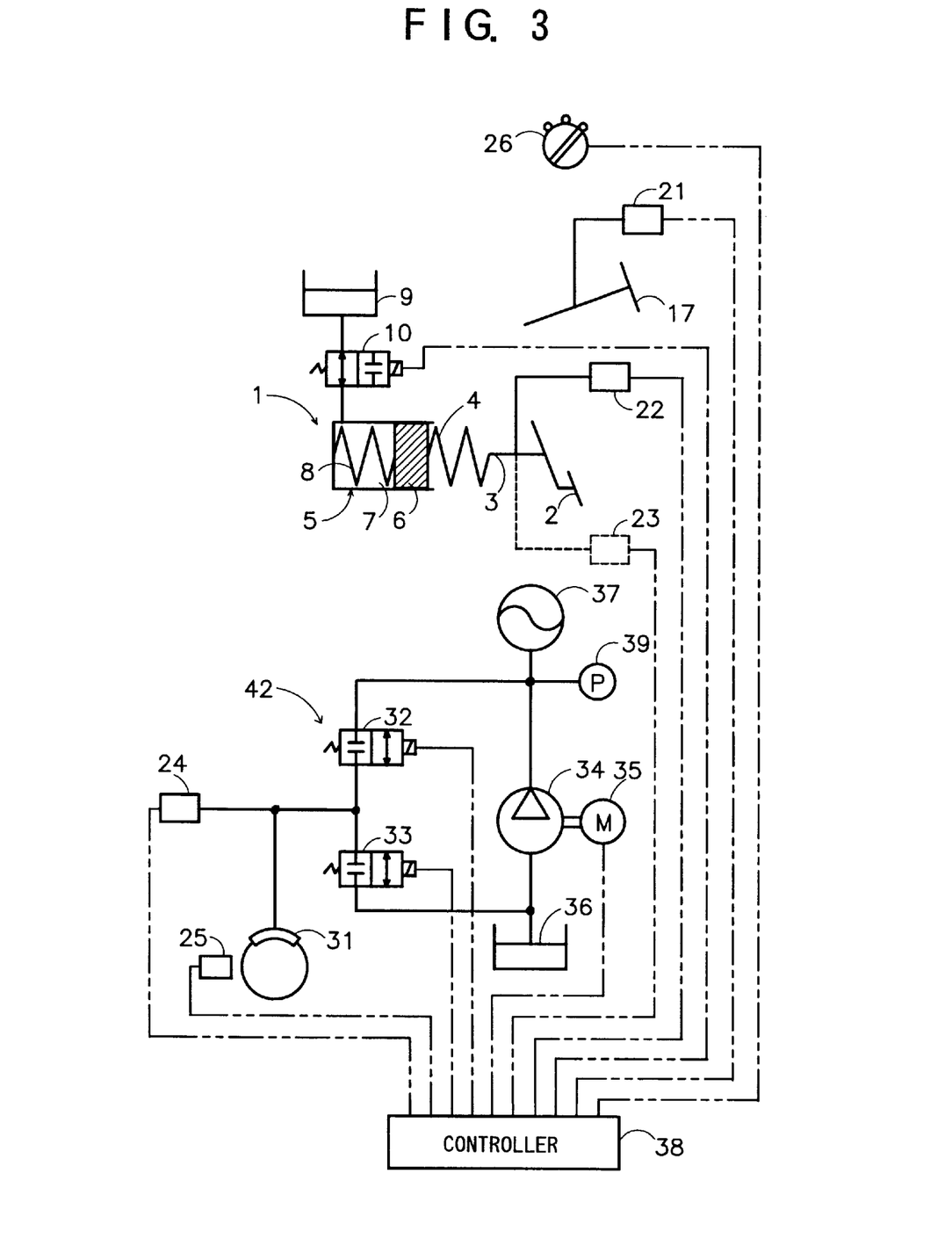
FIG. 3 is a block diagram illustrating a brake control apparatus according to the first embodiment of the present invention.

The brake control apparatus having the stroke simulator 1 as constituted above will be explained hereinafter with reference to FIG. 3. A braking force control device 42 is provided for controlling the braking force applied to the wheels. The braking force control device 42 is disposed independently from the stroke simulator 1 according to the present embodiment, but it may be associated with the simulator 1. In order to detect the vehicle condition or the braking condition accurately, various sensors are installed. For example, a steering angle sensor 21 is installed on a steering wheel 17. A depressing force sensor 22 and a stroke sensor 23 are installed on the brake pedal 2. A pressure sensor 24 is disposed to detect the pressure in the wheel brake cylinder 31. Furthermore, a mode switch 26 is provided for changing the brake feeling in accordance with the driver's selection. The output signals of the sensors are fed to the controller 38, which is adapted to energize the solenoid valve 10 to provide the stroke of the brake pedal 2 only by means of the biasing force of the first elastic member 4, when the output signals from the controller 38 satisfy the predetermined conditions as described later in detail. The braking force control device 42 is adapted to supply the brake fluid to the wheel brake cylinders including a wheel brake cylinder 31 as shown in FIG. 3, thereby to apply the braking force to the wheels. The brake fluid is supplied to the wheel brake cylinder 31 from an accumulator 37 which accumulates the brake fluid discharged from a pump 34 driven by a motor 35. The motor 35 is controlled in dependence upon the pressure of the brake fluid supplied to the wheel brake cylinder 31, which is detected by a pressure sensor 39. When the pressure of the brake fluid is decreased to be lower than a certain level, the pump 34 is driven by the motor 35 to introduce the brake fluid stored in a reservoir 36 and discharge the pressurized brake fluid to the accumulator 37. In the case where the pressure of the brake fluid is to be increased, the pressurized brake fluid accumulated in the accumulator 37 is supplied to the wheel brake cylinder 31 by energizing a normally closed solenoid valve 32. When the pressure in the wheel brake cylinder 31 is to be reduced, the brake fluid therein is drained into the reservoir 36 by energizing a normally closed solenoid valve 33. The solenoid valves 32, 33 and the motor 35 for driving the pump 34 are controlled by the controller 38 in response to the signals input thereto from the mode switch 26 and sensors 21, 22, 23, 24, 25, 39 which detect the vehicle conditions and the braking condition.

Figure 4:
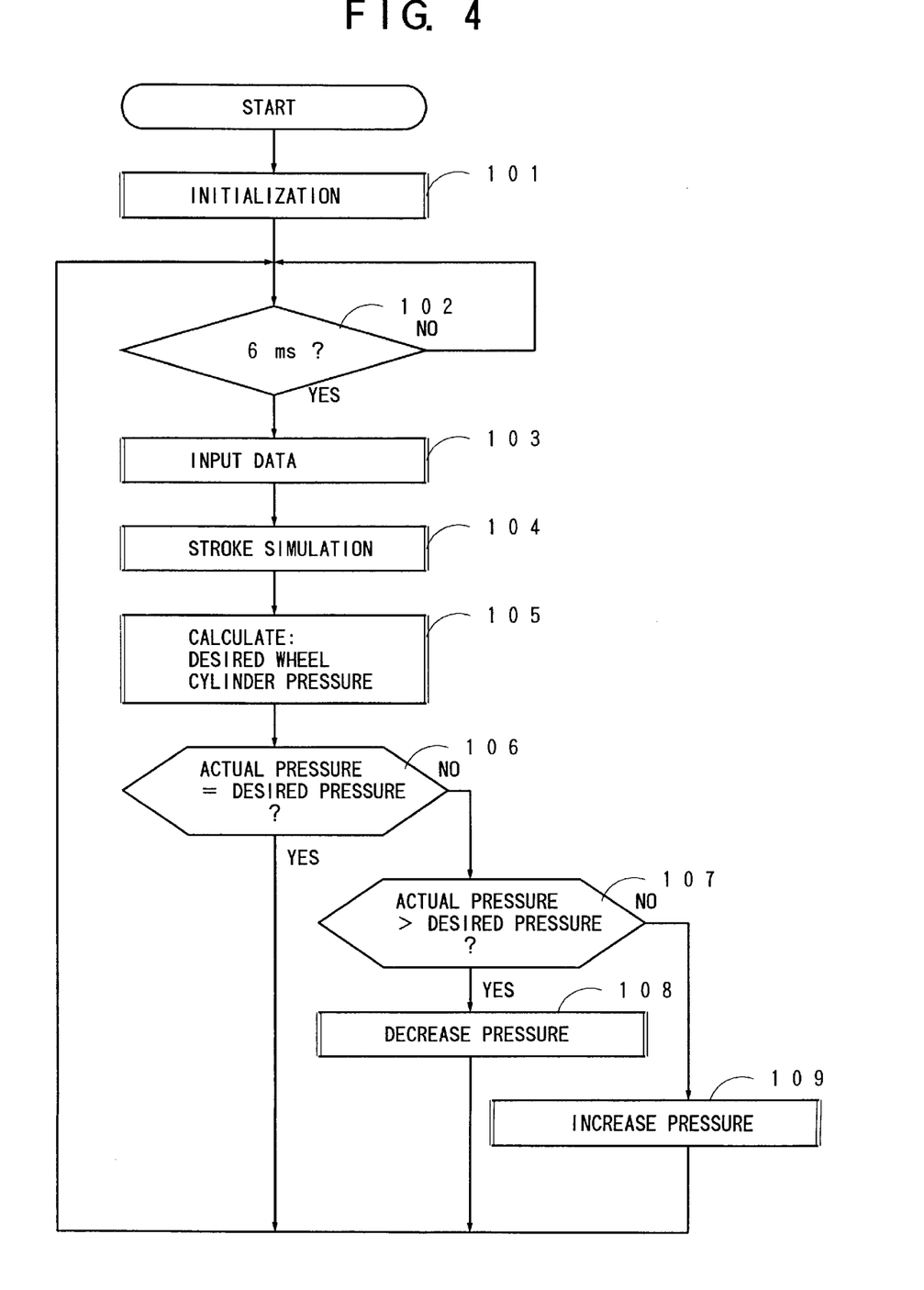
FIG. 4 is a flowchart showing a main routine of the brake control according to the present invention.

According to the present embodiment as constituted above, a program routine for performing the brake control according to the stroke simulator 1 and the braking force control device 42 is executed in accordance with a flowchart as shown in FIG. 4. Its program routine starts when an ignition switch (not shown) is turned on, and electric power is fed to the controller 38 from a battery (not shown). At the outset, initialization of the apparatus is made at Step 101 to clear various data stored in the controller 38 and input initial data into a random access memory, or RAM. Then, the program is set at Step 102 to repeat this main routine with a predetermined period. According to the present embodiment, the main routine is repeated in a 6-millisecond cycle, while the period is not limited to 6 milliseconds. At Step 103, the signals output from the mode switch 26, sensors 21, 22, 23, 24, 25 and etc. are input into the controller 38 through its input ports, and various data are read by a microcomputer (not shown) in the controller 38.

Then, the program proceeds to Step 104 where stroke simulations are performed in accordance with one of the flowcharts as shown in FIGS. 5–13, as will be described later in detail. At Step 105, a desired wheel cylinder pressure it set in accordance with a map which is provided in advance. The program further proceeds to Step 106 where it is determined whether a signal output from the pressure sensor 24, i.e., an actual wheel cylinder pressure is equal to the desired wheel cylinder pressure obtained from the map at Step 105, or not. If the result is affirmative, the program returns to Step 102. If the result is negative, the program proceeds to Step 107, where it is determined whether the actual wheel cylinder pressure is greater than the desired wheel cylinder pressure. If the actual wheel cylinder pressure is greater than the desired wheel cylinder pressure, the program proceeds to Step 108, where the control valve for decreasing the pressure, i.e., pressure decrease solenoid valve 33, is energized to be on. If the actual wheel cylinder pressure is equal to or smaller than the desired wheel cylinder pressure, the program proceeds to Step 109, where the control valve for increasing the pressure, i.e., pressure increase solenoid valve 32, is energized to be on. The solenoid valves 32, 33 are controlled to optimize their "on" period in accordance with a difference between the actual wheel cylinder pressure and the desired wheel cylinder pressure. Thus, Steps 102–109 are repeated to perform the braking force control.

Figure 5:
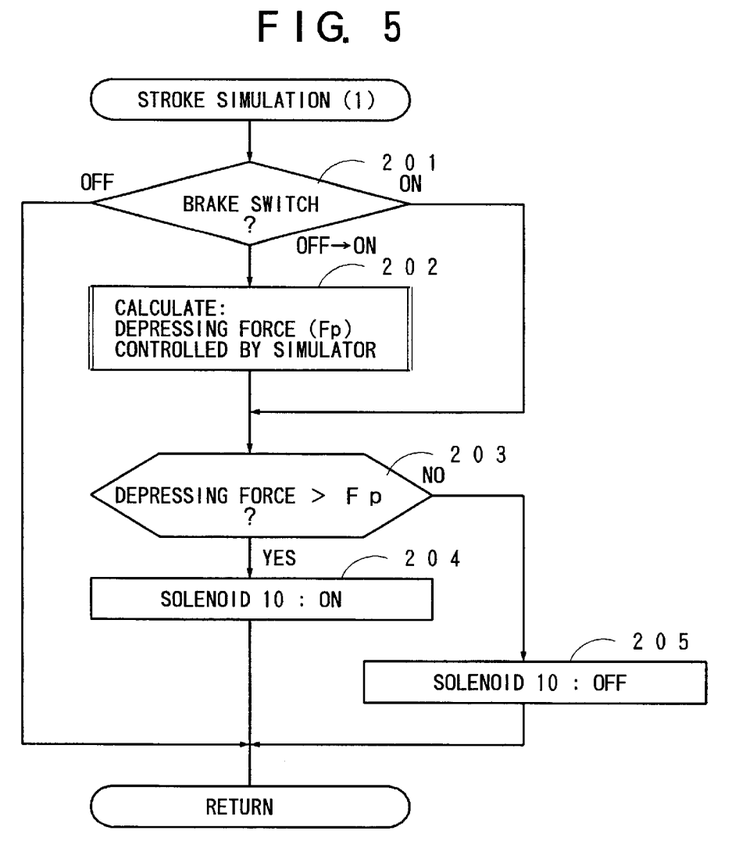
FIG. 5 is a flowchart showing a sub-routine for a first example of a stroke simulation executed in the main routine as shown in FIG. 4.
Figure 6:
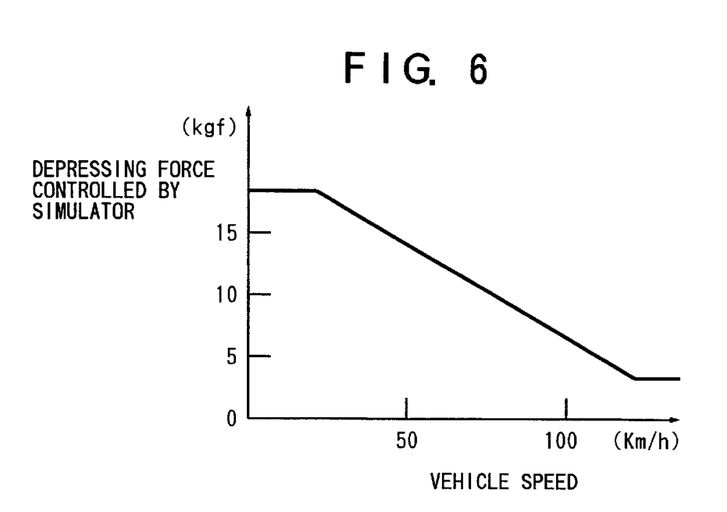
FIG. 6 is a diagram showing a relationship between a wheel speed and depressing force to the stroke simulator for use in the first example of the stroke simulation.

Next, the stroke simulation executed at Step 104 in FIG. 4 will be explained with reference to five examples as follows. FIG. 5 shows a first example of the stroke simulation, where the simulation is determined on the basis of depression of the brake pedal 2. That is, the stroke simulation is determined on the basis of a condition of a brake switch (not shown), which is turned on when the brake pedal 2 is depressed, and turned off when the brake pedal 2 is not depressed. The brake switch is disposed in the vicinity of the brake pedal 2 to output the on/off signal to the input port of the controller 38. Unless the brake pedal 2 is depressed at Step 201, the simulation is not performed. If the brake pedal 2 is depressed, the brake switch is turned on, so that the program proceeds to Step 202. If the brake pedal 2 continues to be depressed, the program proceeds to Step 203. At Step 202, a depressing force to be controlled by the stroke simulator is calculated in accordance with a map as shown in FIG. 6, which is provided in advance for obtaining the depressing force to be controlled by the stroke simulator in response to the vehicle speeds calculated from the wheel speeds obtained by the signals output from the wheel speed sensor 25. That is, a depressing force (Fp) to be controlled is obtained in response to the vehicle speed. Then, at Step 203, the actual depressing force detected by the depressing force sensor 22 is compared with the depressing force (Fp) to be controlled. If the actual depressing force is greater than the depressing force (Fp) obtained from the map, the program proceeds to Step 204, where the solenoid valve 10 is energized to be on. Otherwise, the program proceeds to Step 205, where the solenoid valve 10 is not energized to be off. According to this routine, if the actual depressing force has become greater than the depressing force to be controlled, which is provided in response to the vehicle speed, the characteristic of the depressing force may be changed from a given position of the brake pedal stroke as shown in FIG. 2, so that an appropriate brake feeling can be provided in response to the vehicle speed.

Figure 7:
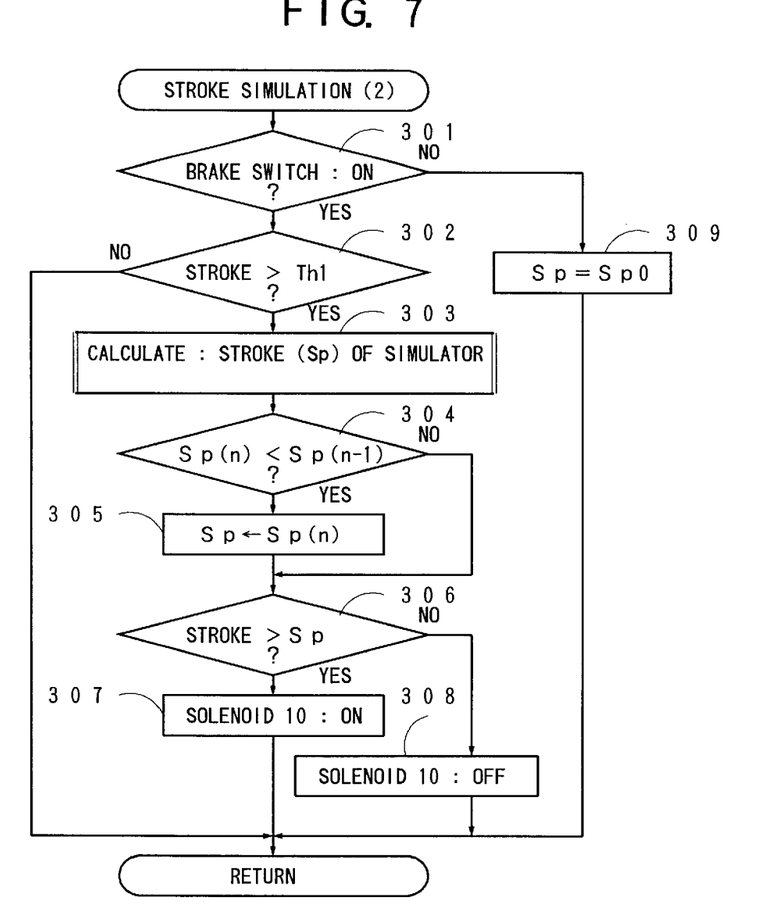
FIG. 7 is a flowchart showing a sub-routine for a second example of the stroke simulation executed in the main routine as shown in FIG. 4.
Figure 8:
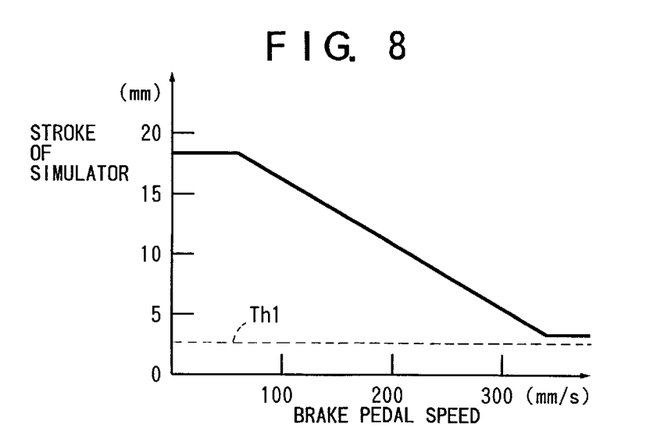
FIG. 8 is a diagram showing a relationship between a brake pedal speed and a stroke of the stroke simulator to be controlled for use in the second example of the stroke simulation.

FIG. 7 shows a second example of the stroke simulation, where it is determined at Step 301 whether the brake pedal 2 is depressed, or not. If it is determined at Step 301 that the brake pedal 2 is not depressed, the program proceeds to Step 309, where an initial value (Sp0) is set for a stroke to be controlled (Sp), and returns to the main routine. On the contrary, if the brake pedal 2 is depressed, and the brake switch is turned on, the program proceeds to Step 302, where a signal indicative of a pedal stroke output from the stroke sensor 23 is determined. At Step 302, it is determined whether the pedal stroke detected by the actual sensor is greater than a predetermined value (Th1), or not. If the result is affirmative, the program proceeds to Step 303. Otherwise, the program returns to the main routine. Then, at Step 303, a stroke to be controlled by the stroke simulator is calculated for the present cycle, to provide the presently obtained value Sp(n) of the stroke to be controlled (Sp). This value is calculated in accordance with a map as shown in FIG. 8, which is provided in advance for obtaining the stroke to be controlled by the stroke simulator in response to a brake pedal speed which is calculated by dividing the variation of the signals fed from the stroke sensor 23 by the calculating period. Then, at Step 304, it is determined whether the present value Sp(n) obtained at Step 303 is smaller than the previously obtained value Sp(n−1). If the result is affirmative, the present value Sp(n) is provided for the stroke to be controlled (Sp) at Step 305, then the program proceeds to Step 306. Therefore, the value of the stroke to be controlled (Sp) is used for the value Sp(n) in the next cycle. On the contrary, if the present value Sp(n) is equal to or greater than the previous value Sp(n−1), the program proceeds to Step 306, where an actual stroke detected by the stroke sensor 23 is compared with the stroke to be controlled (Sp). If the actual stroke is greater than the stroke to be controlled (Sp), the program proceeds to Step 307, where the solenoid valve 10 is energized to be on. Otherwise, the program proceeds to Step 308, where the solenoid valve 10 is not energized to be off. According to this routine, if the actual pedal stroke has become greater than the stroke obtained from the brake pedal speed, the characteristic of the depressing force may be changed from a given position of the brake pedal stroke as shown in FIG. 2, so that an appropriate brake feeling can be provided in response to the brake pedal speed.

Figure 9:
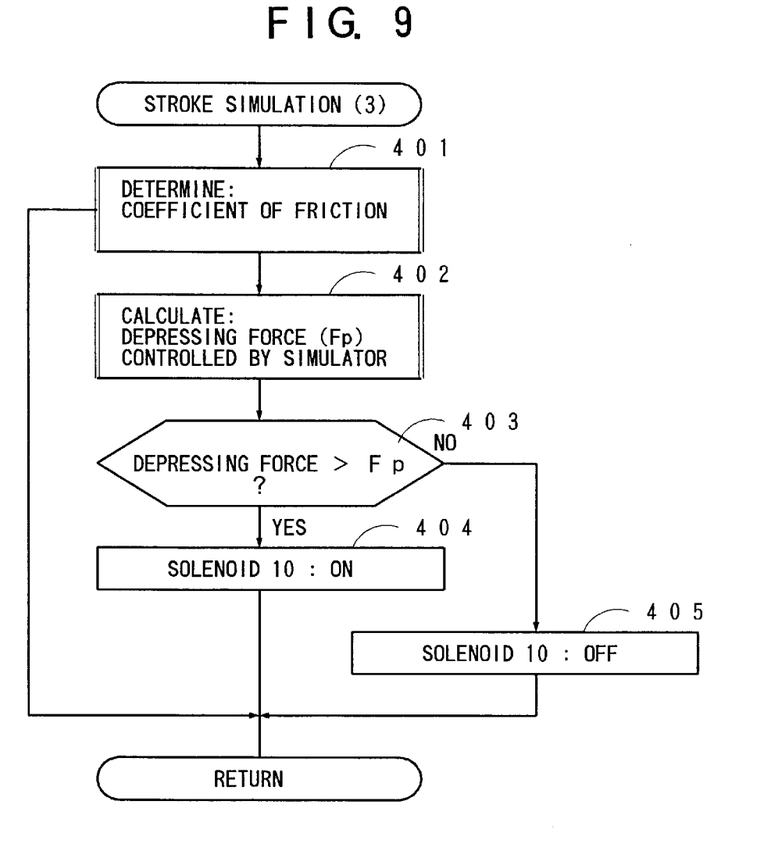
FIG. 9 is a flowchart showing a sub-routine for a third example of the stroke simulation executed in the main routine as shown in FIG. 4.
Figure 10:
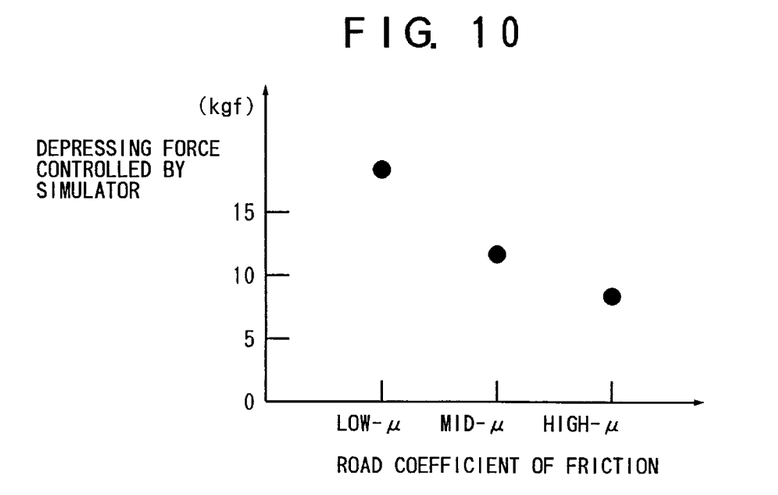
FIG. 10 is a diagram showing a relationship between a road coefficient of friction and depressing force to the stroke simulator for use in the third example of the stroke simulation.

FIG. 9 shows a third example of the stroke simulation, where a coefficient of friction of the road (abbreviated as road $\mu$) is determined at Step 401. That is, the coefficient of friction of the road on which the vehicle is traveling is selected from one of a low-$\mu$, mid-$\mu$ and high-$\mu$, by estimating a vehicle speed on the basis of the output of the wheel speed sensor 25 provided for each wheel, and determining a level of drop of each wheel speed on the basis of the estimated vehicle speed. At Step 402, the depressing force to be controlled by the stroke-simulator is calculated in accordance with a map as shown in FIG. 10, which is provided in advance for obtaining the depressing force to be controlled by the stroke simulator in accordance with the road $\mu$ selected at Step 401. Then, at Step 403, the actual depressing force detected by the depressing force sensor 22 is compared with the depressing force to be controlled (Fp) which is obtained from the map. If the actual depressing force is greater than the depressing force to be controlled (Fp), the program proceeds to Step 404, where the solenoid valve 10 is energized to be on. Otherwise, the program proceeds to Step 405, where the solenoid valve 10 is not energized to be off. According to this routine, if the actual depressing force has become greater than the stroke to be controlled, which is obtained from the road $\mu$, the depressing force characteristic may be changed from a given position of the brake pedal stroke, as shown in FIG. 2 Therefore, an appropriate brake feeling can be provided in accordance with the road $\mu$.

Figure 11:
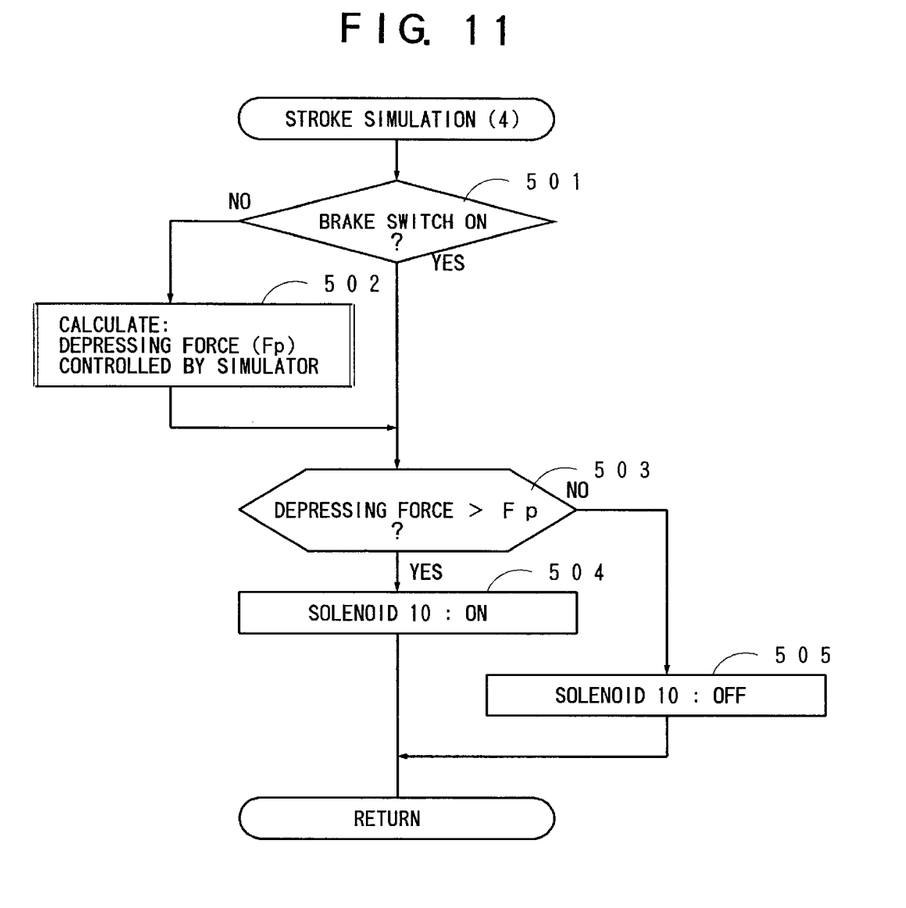
FIG. 11 is a flowchart showing a sub-routine for a fourth example of the stroke simulation executed in the main routine as shown in FIG. 4.
Figure 12:
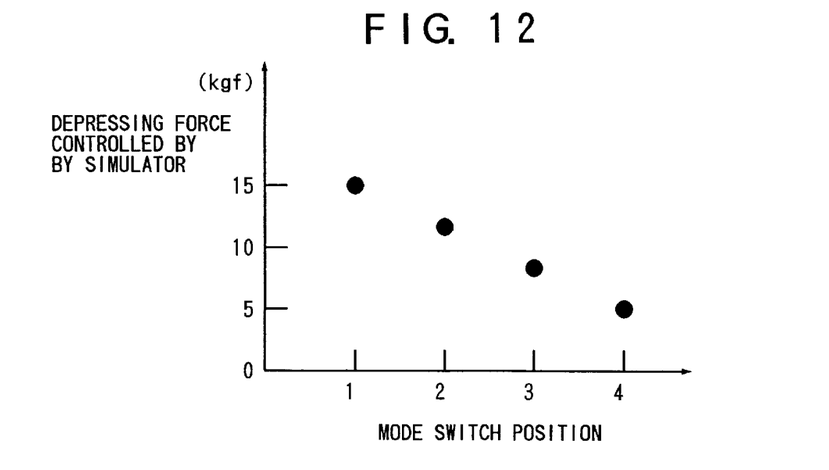
FIG. 12 is a diagram showing a relationship between a selected position of a mode switch and depressing force to the stroke simulator for use in the fourth example of the stroke simulation.

FIG. 11 shows a fourth example of the stroke simulation, wherein it is determined at Step 501 whether the brake pedal 2 is depressed, or not. If the brake pedal 2 is depressed, and the brake switch is turned on, then the program proceeds to Step 503. If the brake pedal 2 is not depressed, the program proceeds to Step 502, where the depressing force to be controlled by the stroke simulator is calculated in accordance with a map as shown in FIG. 12, which is provided in advance for setting the depressing force to be controlled by the stroke simulator in accordance with a position of the mode switch 26 for changing the braking characteristic. The mode switch 26 is a multistage changeover switch, e.g., 4 stages in this example, to change the brake feeling. Then, at Step 503, the actual depressing force detected by the depressing force sensor 22 is compared with the depressing force to be controlled (Fp) which is obtained from the map. If the actual depressing force is greater than the depressing force to be controlled (Fp), the program proceeds to Step 504, where the solenoid valve 10 is energized to be on. Otherwise, the program proceeds to Step 505, where the solenoid valve 10 is not energized to be off. According to this routine, if the actual depressing force has become greater than the stroke obtained in accordance with the selected position of the mode switch 26, the depressing force characteristic may be changed from a given position of the brake pedal stroke as shown in FIG. 2. Therefore, an appropriate brake feeling can be provided in accordance with the vehicle driver's taste.

Figure 13:
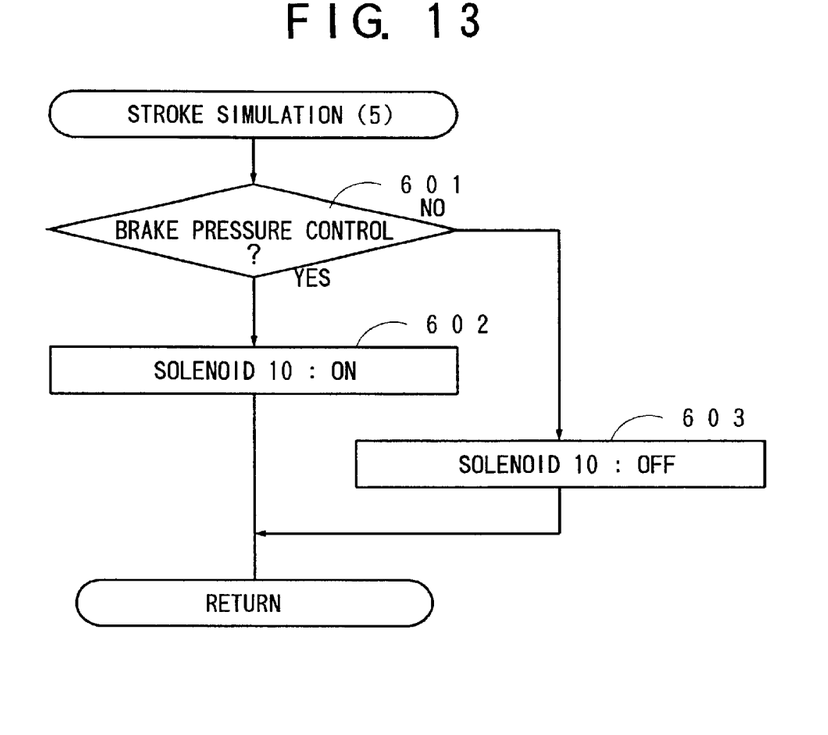
FIG. 13 is a flowchart showing a sub-routine for a fifth example of the stroke simulation executed in the main routine as shown in FIG. 4.

FIG. 13 shows a fifth example of the stroke simulation, wherein it is determined at Step 601 whether a brake pressure control, such as an anti-skid control, a stability control, or the like is being performed, or not. If the brake pressure control is being performed, the program proceeds to Step 602, where the solenoid valve 10 is energized to be on. Otherwise, the program proceeds to Step 603, where the solenoid valve 10 is not energized to be off. According to this routine, if the brake pressure control is being performed, the depressing force characteristic may be changed from a given position of the brake pedal stroke, as shown in FIG. 2. Therefore, an appropriate brake feeling can be provided in the brake pressure control.

Figure 14:
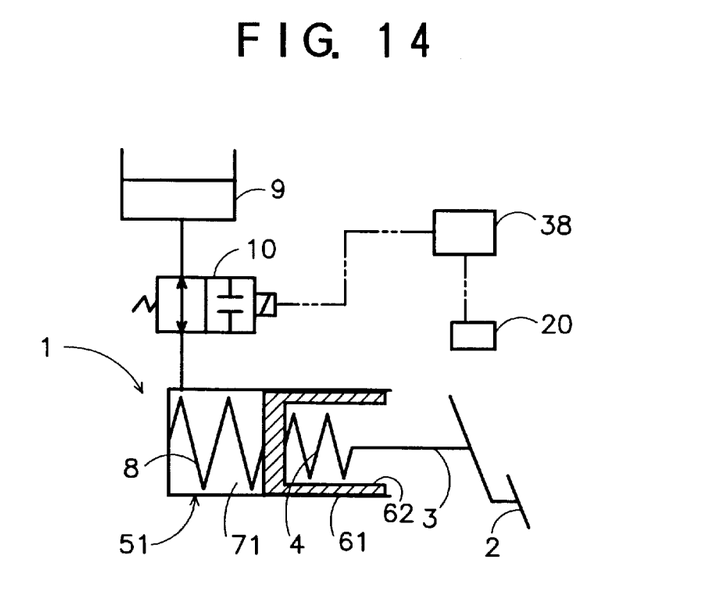
FIG. 14 is a block diagram illustrating a second embodiment of the stroke simulator for use in the brake control apparatus according to the present invention.

Next, other embodiments of the stroke simulator 1 will be explained with reference to FIGS. 14–18. FIG. 14 illustrates a second embodiment of the simulator 1. The brake pedal 2 is connected to the rod 3, which is connected to one end of the first elastic member 4. A piston 61 formed with a recess 62 for receiving the other end of the first elastic member 4 is slidably fitted into a cylinder 51. A pressure chamber 71 is defined between the piston 61 and the cylinder 51. The second elastic member 8 is disposed in the pressure chamber 71 to be placed in series with the first elastic member 4, and adapted to bias the piston 61 to its initial position where the brake pedal 2 is not depressed.

The pressure chamber 71 is communicated with the reservoir 9 through an output port, from which the brake fluid is discharged in response to forward movement of the piston 61.

The solenoid valve 10 of a normally open type is disposed between the reservoir 9 and the output port of the cylinder 51, and controlled by the controller 38 on the basis of the signals output from the sensor 20. According to this embodiment with the first elastic member 4 accommodated in the recess 62 of the piston 61, therefore, the stroke simulator 1 can be made small in its axial direction. In operation, if the brake pedal 2 is depressed when the solenoid valve 10 is off, the brake pedal 2 is moved against the biasing force of the first elastic member 4 and second elastic member 8. When the solenoid valve 10 is turned on, the communication between the pressure chamber 71 and the reservoir 9 is shut off, so that the volume of the pressure chamber 71 is not varied. That is, the sliding movement of the piston 61 is stopped, and the brake pedal 2 is moved only against the biasing force of the first elastic member 4. Therefore, the braking characteristic can be changed by energizing the solenoid valve 10 at a proper time when a predetermined condition is satisfied.

Figure 15:
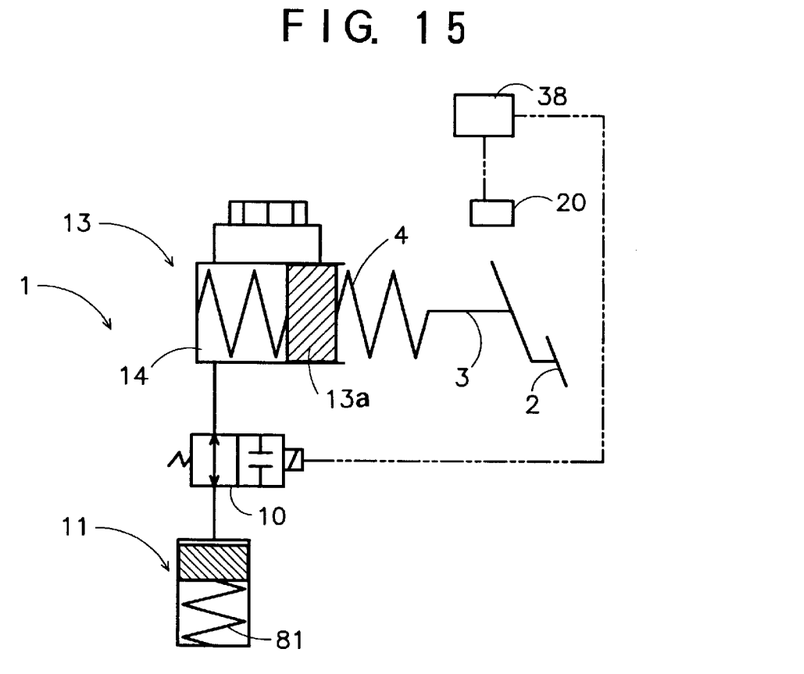
FIG. 15 is a block diagram illustrating a third embodiment of the stroke simulator for use in the brake control apparatus according to the present invention.

FIG. 15 illustrates a third embodiment of the simulator 1, wherein the brake pedal 2 is connected to one end of the rod 3, which is connected to one end of the first elastic member 4. The other end of the rod 3 is connected to a master piston 13a of a master cylinder 13. A pressure chamber 14 is defined in the master cylinder 13, and its volume is varied in response to sliding movement of the master piston 13a. A first absorbing device 11 is connected to the pressure chamber 14 to absorb the brake fluid discharged from the pressure chamber 14, and return the brake fluid thereto by means of biasing force of a second elastic member 81. That is, the first absorbing device 11 includes the second elastic member 81 which is accommodated in a housing of the device 11, and which is adapted to bias the brake fluid to be discharged into the pressure chamber 14 of the master cylinder 13. The normally open solenoid valve 10 is disposed between the master cylinder 13 and the first absorbing device 11, and controlled by the controller 38 on the basis of the signals output from the sensor 20. In operation, if the brake pedal 2 is depressed when the solenoid valve 10 is off, the brake pedal 2 is moved against substantially the total of biasing forces of the first elastic member 4 and second elastic member 81, because a spring accommodated in the master cylinder 13 has a relatively small biasing force. When the solenoid valve 10 is turned on, the communication between the pressure chamber 14 and the first absorbing device 11 is shut off, so that the volume of the pressure chamber 14 of the master cylinder 13 is not varied. In this case, only the biasing force of the first elastic member 4 acts against depression of the brake pedal 2. Therefore, the braking characteristic can be changed by energizing the solenoid valve 10 at a proper time when a predetermined condition is satisfied.

Figure 16:
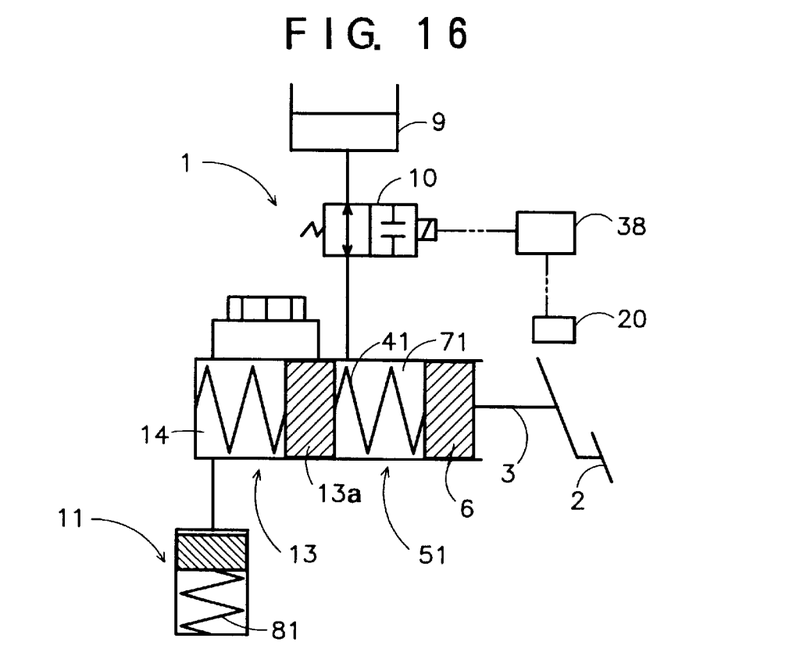
FIG. 16 is a block diagram illustrating a fourth embodiment of the stroke simulator for use in the brake control apparatus according to the present invention.

FIG. 16 illustrates a fourth embodiment of the simulator 1, wherein the brake pedal 2 is connected to one end of the rod 3, which is connected to a cylinder 51 and a master cylinder 13, in series. One end of the rod 3 is connected to the piston 6 which is slidably received in the cylinder 51, in which a first elastic member 41 is provided for biasing the brake pedal 2 to the initial position thereof. The other end of the rod 3 is connected to the master piston 13a in the master cylinder 13. A pressure chamber 71 is defined in the cylinder 51, and connected to the reservoir 9 to drain the brake fluid in the pressure chamber 71. Then, the normally open solenoid valve 10 is disposed between the pressure chamber 71 and the reservoir 9, and controlled by the controller 38 on the basis of the signals output from the sensor 20. The first absorbing device 11 is connected to the pressure chamber 14 to absorb the brake fluid discharged from the pressure chamber 14, and return the brake fluid thereto. The second elastic member 81 is disposed in the first absorbing device 11 to return the brake fluid therein to the master cylinder 13. In operation, if the brake pedal 2 is depressed when the solenoid valve 10 is off, the brake pedal 2 is moved against substantially the total of biasing forces of the first elastic member 41 and second elastic member 81, because the spring accommodated in the master cylinder 13 has a relatively small biasing force. When the solenoid valve 10 is turned on, the communication between the pressure chamber 71 and the reservoir 9 is shut off, so that the volume of the pressure chamber 71 of the cylinder 51 is not varied. In this case, only the biasing force of the second elastic member 81 acts against depression of the brake pedal 2. Therefore, the braking characteristic can be changed by energizing the solenoid valve 10 at a proper time when a predetermined condition is satisfied.

Figure 17:
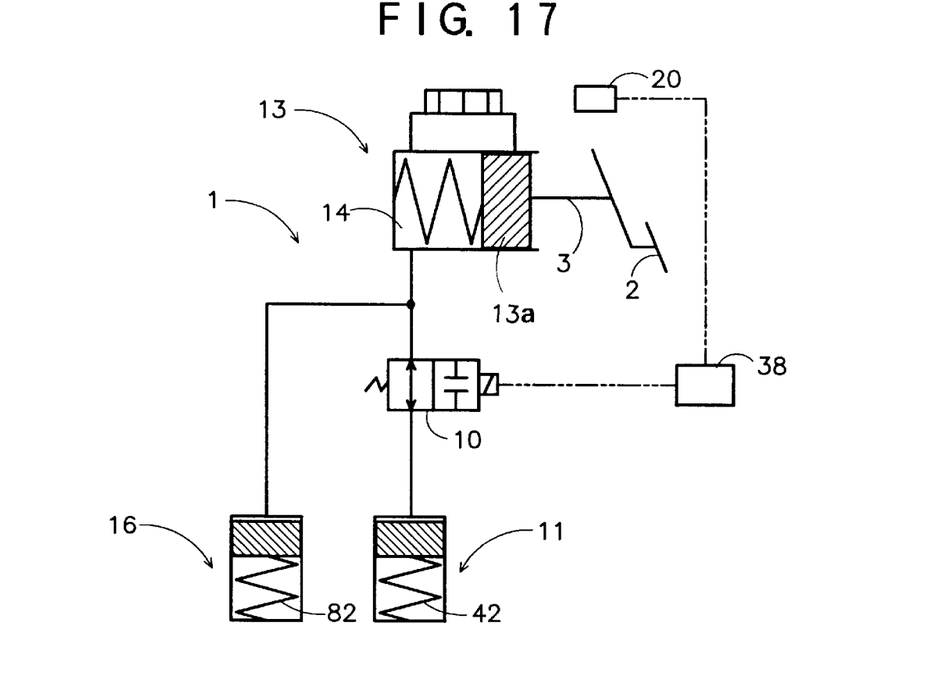
FIG. 17 is a block diagram illustrating a fifth embodiment of the stroke simulator for use in the brake control apparatus according to the present invention.

FIG. 17 illustrates a fifth embodiment of the simulator 1, wherein the brake pedal 2 is connected to one end of the rod 3, the other end of which is connected to the master piston 13a in the master cylinder 13. The first absorbing device 11 is connected to the pressure chamber 14 to absorb the brake fluid discharged from the pressure chamber 14, and return the brake fluid thereto by means of the biasing force of the first elastic member 42. In addition, a second absorbing device 16 is connected to the pressure chamber 14 to absorb the brake fluid discharged from the pressure chamber 14. The second absorbing device 16 has a second elastic member 82 therein to return the brake fluid to the master cylinder 13. The normally open solenoid valve 10 is disposed between the master cylinder 13 and the first absorbing device 11, and controlled by the controller 38 on the basis of the signals output from the sensor 20. In operation, if the brake pedal 2 is depressed when the solenoid valve 10 is off, the brake pedal 2 is moved against substantially the total of biasing forces of the first elastic member 42 and second elastic member 82, because the spring accommodated in the master cylinder 13 has a relatively small biasing force. When the solenoid valve 10 is turned on, the communication between the pressure chamber 14 and the first absorbing device 11 is shut off, so that only the biasing force of the second elastic member 82 acts against depression of the brake pedal 2. Therefore, the braking characteristic can be changed by energizing the solenoid valve 10 at a proper time when a predetermined condition is satisfied.

Figure 18:
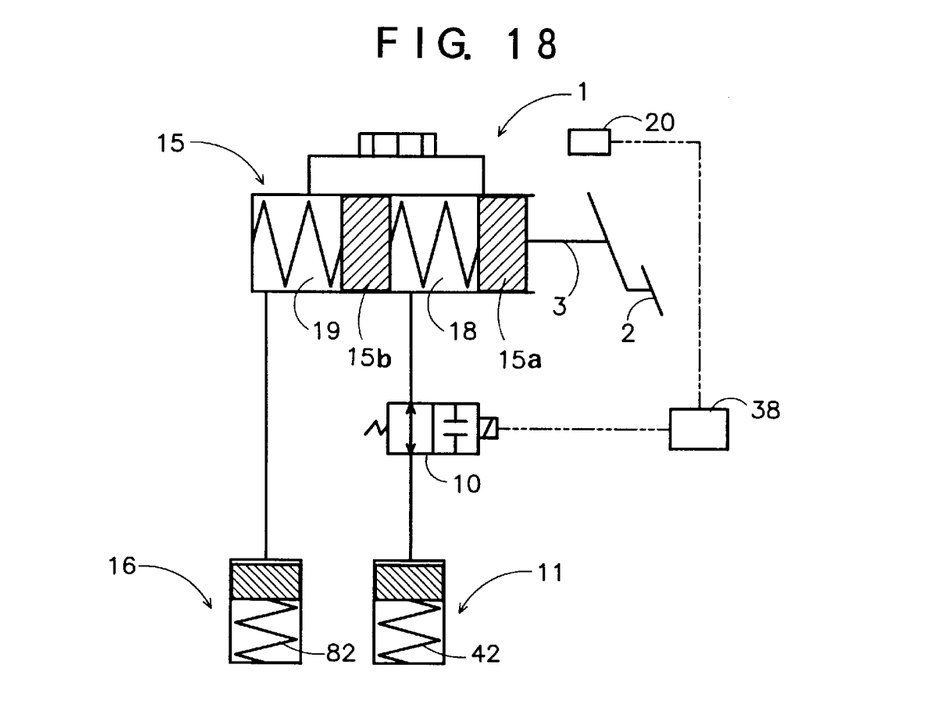
FIG. 18 is a block diagram illustrating a sixth embodiment of the stroke simulator for use in the brake control apparatus according to the present invention.

FIG. 18 illustrates a sixth embodiment of the simulator 1, wherein a master cylinder 15 having a first pressure chamber 18 and a second pressure chamber 19 defined therein, and a first piston 15a and a second piston 15b slidably received in the first and second pressure chambers 18, 19, respectively. The brake pedal 2 is connected to one end of the rod 3, the other end of which is connected to the first piston 15a. The first absorbing device 11 is connected to the first pressure chamber 18 to absorb the brake fluid discharged from the first pressure chamber 18, and return the brake fluid thereto. A first elastic member 42 is disposed in the first absorbing device 11 to return the brake fluid therein to the master cylinder 13. Also, the second absorbing device 16 is connected to the second pressure chamber 19 to absorb the brake fluid discharged from the second pressure chamber 19, and return the brake fluid thereto. A second elastic member 82 is disposed in the second absorbing device 11 to return the brake fluid therein to the master cylinder 13. Then, the normally open solenoid valve 10 is disposed between the first pressure chamber 18 of the master cylinder 15 and the first absorbing device 11, and controlled by the controller 38 on the basis of the signals output from the sensor 20. In operation, if the brake pedal 2 is depressed when the solenoid valve 10 is off, the brake pedal 2 is moved against substantially the total of biasing forces of the first elastic member 42 and second elastic member 82, because both of the springs accommodated in the master cylinder 15 have a relatively small biasing force. When the solenoid valve 10 is turned on, the communication between the first pressure chamber 18 and the first absorbing device 11 is shut off, so that only the biasing force of the second elastic member 82 acts against depression of the brake pedal 2. Therefore, the braking characteristic can be changed by energizing the solenoid valve 10 at a proper time when a predetermined condition is satisfied.

In the embodiments as shown in FIGS. 14–18, a check valve (not shown) may be provided for bypassing the solenoid valve 10. The check valve 10 is adapted to prevent the brake pedal 2 from being delayed in its returning motion when the brake pedal 2 is released rapidly while the solenoid valve 10 is on, due to delayed response of the valve 10 when it ifs turned off. It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A brake control apparatus having a simulation means for applying a biasing force to a manually operated braking member of a vehicle in response to braking operation of said manually operated braking member comprising:

detection means for detecting conditions of said vehicle including a braking condition of said vehicle;

first biasing means for applying a first biasing force to said manually operated braking member in response to braking operation of said manually operated braking member; and second biasing means for applying a second biasing force to said manually operated braking member in response to braking operation of said manually operated braking member;

braking force control means for controlling a pressure of brake fluid applied to a wheel brake cylinder in response to the conditions detected by said detection means;

pressure generating means for discharging a pressurized brake fluid to said braking force control means; and wherein only one of said first and second biasing means is adapted to apply the biasing force to said manually operated braking member in response to braking operation of said manually operated braking member to positively change a characteristic between a depressing force and a depressing stroke of said manually operated braking member, when a predetermined condition is detected by said detection means.

2. A brake control apparatus as set forth in claim 1, wherein said second biasing means comprises:

cylinder means including a cylinder having a bore defined therein, and a piston slidably received in said bore to define a chamber filled with brake fluid;

elastic means for biasing said piston to expand said chamber; and reservoir means communicated with said chamber of said cylinder means for storing the brake fluid drained from said cylinder means.

3. A brake control apparatus as set forth in claim 2, further comprising:

valve means disposed between said reservoir means and said cylinder means; and control means for controlling said valve means in response to outputs of said detection means, said control means activating said valve means to apply the second biasing force to said manually operated braking member in response to braking operation of said manually operated braking member, when the predetermined condition is detected by said detection means.

4. A brake control apparatus as set forth in claim 3, wherein said piston of said cylinder means has a recess formed on an end opposite to said chamber, and wherein said first biasing means comprises an elastic member connected at one end thereof with said manually operated braking member, and accommodated in said recess to be connected at the other end of said elastic member with said piston of said second biasing means.

5. A brake control apparatus as set forth in claim 3, wherein said cylinder means comprises:
a master cylinder having a cylinder bore defined therein;
a master piston slidably received in said cylinder bore to define a pressure chamber; and
a low-pressure reservoir communicated with said pressure chamber for storing the brake fluid, and wherein said reservoir means and said elastic means are formed in a body to provide absorbing means for absorbing the brake fluid from said pressure chamber, said absorbing means comprising:
a housing defined therein an absorbing chamber for storing the brake fluid drained from said pressure chamber; and
an elastic member accommodated in said absorbing chamber for biasing the brake fluid therein to discharge to said pressure chamber.

6. A brake control apparatus as set forth in claim 3, wherein said first biasing means comprises:
a master cylinder having a cylinder bore defined therein;
a master piston slidably received in said cylinder bore to define a pressure chamber;
a low-pressure reservoir communicated with said pressure chamber for storing the brake fluid; and
absorbing means communicated with said pressure chamber for absorbing the brake fluid therefrom, said absorbing means including a housing defined therein an absorbing chamber for storing the brake fluid drained from said pressure chamber, and an elastic member accommodated in said absorbing chamber for biasing the brake fluid therein to discharge to said pressure chamber.

7. A brake control apparatus as set forth in claim 3, wherein said cylinder means comprises:
a master cylinder having a cylinder bore defined therein;
a master piston slidably received in said cylinder bore to define a pressure chamber; and
a low-pressure reservoir communicated with said pressure chamber for storing the brake fluid, wherein said reservoir means and said elastic means are formed in a body to provide first absorbing means for absorbing the brake fluid from said pressure chamber, said first absorbing means including:
a first housing defined therein a first absorbing chamber for storing the brake fluid drained from said pressure chamber; and
a first elastic member accommodated in said first absorbing chamber for biasing the brake fluid therein to discharge to said pressure chamber, and wherein said first biasing means comprises:
second absorbing means communicated with said pressure chamber for absorbing the brake fluid from said pressure chamber, said second absorbing means including:
a second housing defined therein a second absorbing chamber for storing the brake fluid drained from said pressure chamber; and
a second elastic member accommodated in said second absorbing chamber for biasing the brake fluid therein to discharge to said pressure chamber.

8. A brake control apparatus as set forth in claim 3, wherein said cylinder means comprises:
a tandem master cylinder having a cylinder bore defined therein;
a primary master piston and a secondary master piston slidably received in said cylinder bore to define a primary pressure chamber and a secondary pressure chamber, respectively; and
a low-pressure reservoir communicated with said primary pressure chamber and secondary pressure chamber for storing the brake fluid, and wherein said reservoir means and said elastic means are formed in a body to provide first absorbing means for absorbing the brake fluid from said primary pressure chamber, said first absorbing means including:
a first housing defined therein a first absorbing chamber for storing the brake fluid drained from said primary pressure chamber; and
a first elastic member accommodated in said first absorbing chamber for biasing the brake fluid therein to discharge to said primary pressure chamber, and wherein said first biasing means comprises:
second absorbing means communicated with said secondary pressure chamber for absorbing the brake fluid from said secondary pressure chamber, said second absorbing means including:
a second housing defined therein a second absorbing chamber for storing the brake fluid drained from said secondary pressure chamber; and
a second elastic member accommodated in said second absorbing chamber for biasing the brake fluid therein to discharge to said secondary pressure chamber.

9. A brake control apparatus as set forth in claim 1, wherein said detection means includes a brake switch for detecting the operation of said manually operated braking member, and wherein only one of said first and second biasing means is adapted to apply the biasing force to said manually operated braking member in response to braking operation of said manually operated braking member, when the brake switch detects the operation of said manually operated braking member.

10. A brake control apparatus as set forth in claim 1, wherein said detection means includes one of a depressing force sensor for detecting a depressing force of said manually operated braking member, a stroke sensor for detecting a stroke of said manually operated braking member, a steering angle sensor for detecting a steering angle of said vehicle, a pressure sensor for detecting pressure in brake pressure circuits of said vehicle, and a wheel speed sensor for detecting a wheel speed of each wheel of said vehicle, and wherein only one of said first and second biasing means is adapted to apply the biasing force to said manually operated braking member in response to braking operation of said manually operated braking member, when the predetermined condition is detected by one of said sensors.

11. A brake control apparatus as set forth in claim 1, further comprising a mode switch for selectively placing one of positions indicative of a plurality of driving modes by a vehicle driver, only one of said first and second biasing means being adapted to apply the biasing force to said manually operated braking member in response to braking operation of said manually operated braking member, when said mode switch is placed in a predetermined position.

* * * * *